Sept. 14, 1954   W. M. SMITH ET AL   2,689,089
HYDRAULIC DAMPER CONTROL
Filed Oct. 5, 1950
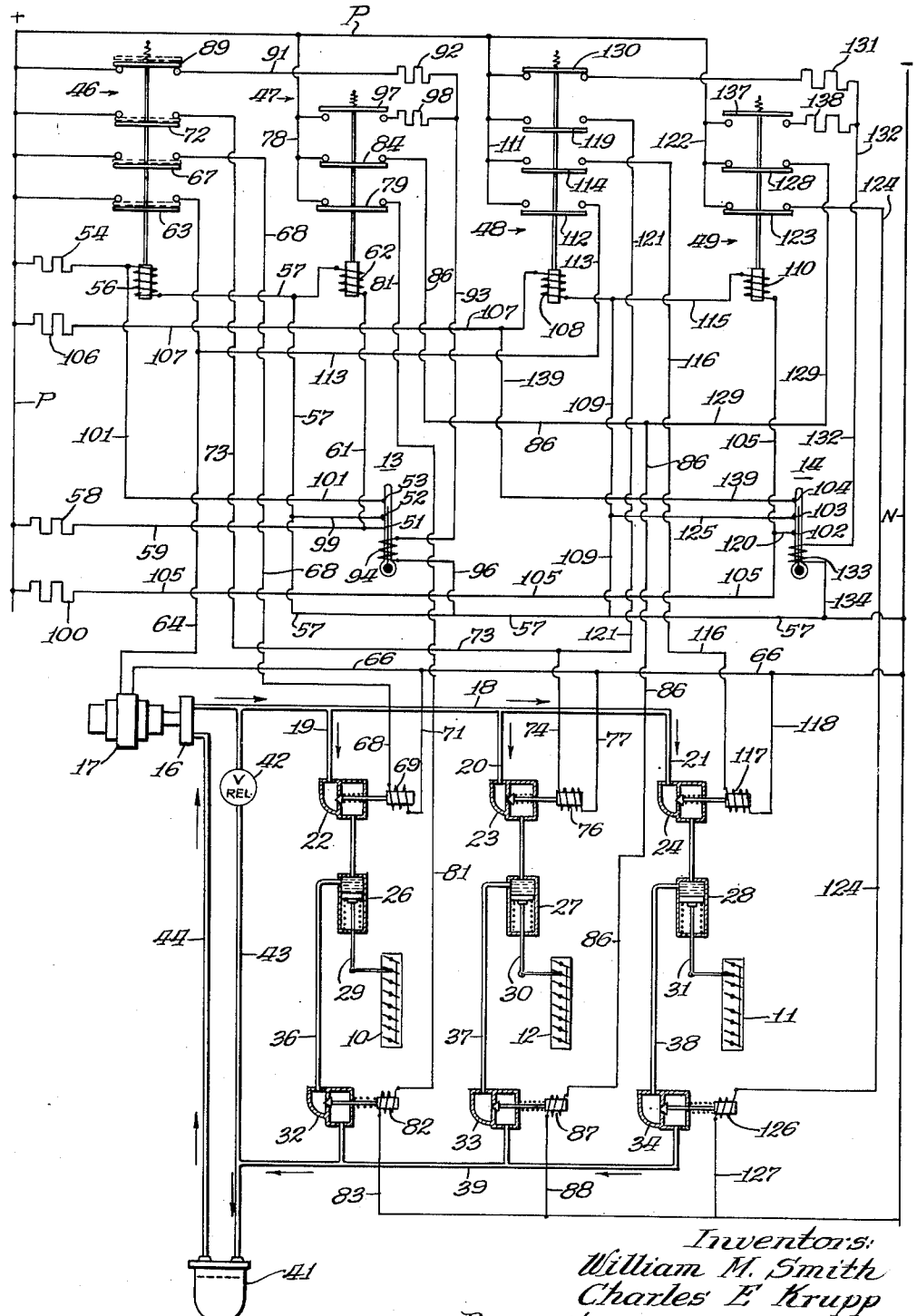
Inventors:
William M. Smith
Charles E. Krupp
By Harvey M. Gillespie Atty.

Patented Sept. 14, 1954

2,689,089

UNITED STATES PATENT OFFICE 2,689,089

HYDRAULIC DAMPER CONTROL

William M. Smith, Glen Ellyn, and Charles E. Krupp, Evanston, Ill., assignors to Vapor Heating Corporation, Chicago, Ill., a corporation of Delaware Application October 5, 1950, Serial No. 188,618

11 Claims. (Cl. 236—35.3)

This invention relates generally to temperature control systems and more particularly to an electric circuit and an apparatus associated therewith for automatically adjusting a plurality of valves, for example air dampers or ventilators for controlling ambient temperatures at predetermined locations.

The improvements of the present invention are suitable for use in any situation in which an ambient temperature can be controlled by selectively operating one or more of a plurality of valves, dampers, etc. However, for the purpose of showing one specific use of the invention, it is shown herein as a means for automatically adjusting the ventilator shutters for varying the amount of air delivered to the cooling systems for the engines of a diesel-electric locomotive. The power units of such locomotives ordinarily includes two engines and it is desirable to so control the delivery of air to their cooling systems as will insure operation of both engines at an optimum efficiency.

It is sometimes the practice to provide such engines with a main radiator and an auxiliary radiator. In such case, the main radiator, associated with each engine, is regulated by a main shutter associated therewith and the auxiliary radiators for both engines may be supplied with cool air from a single shutter.

The present invention, therefore, provides means whereby the temperature of each engine, in addition to controlling its main radiator, will also exercise control over the auxiliary shutters.

According to the present invention, the main shutter of each engine is controlled by a circuit responsive to the condition of such engine, and concomitantly the auxiliary set of shutters for its auxiliary radiator may likewise be controlled, the circuit being so designed that once control is effected over the main shutter of one engine together with the auxiliary shutter, a changing temperature condition of the other engine is able to affect its main shutter only and is not able to affect the condition of the auxiliary shutter. The present invention is further characterized by a fluid pressure system including a pump and a motor which are required to be operated only when the shutters are to be operated in accordance with a temperature condition.

A principal object of the invention, therefore, is to control temperature responsive mechanisms, consisting of a pair of main temperature responsive devices and an auxiliary temperature responsive device, in accordance with a temperature condition at two stations, or two temperature measuring points, each station controlling a main temperature responsive device and under certain auxiliary temperature responsive device, the control of said auxiliary temperature device by one of said stations being thereafter unaffected by any control by the other of said stations, until the first station no longer controls said auxiliary temperature responsive device.

Other objects and important features of the invention will be apparent from a study of this specification, taken with the drawing, which together illustrate a preferred embodiment of the invention and what is now considered to be the best mode of applying the principles thereof. The scope of the invention is intended to be defined by the scope and breadth of the appended claims rather than the specific structures and use thereof described herein.

In the drawing, the single figure is a circuit diagram illustrating a control system for the main and auxiliary shutters of the radiators of a twin engine diesel-electric locomotive unit.

Referring now to the drawing, the control system according to the present invention, is shown as being adapted to control a main shutter 10 of a main radiator, not shown, of a first engine; a main shutter 11 of a main radiator, not shown, of a second engine; and an auxiliary shutter 12 of the auxiliary radiators of both the first and second engines.

The temperature or other running condition of the first engine is measured by a first thermostat 13, and the temperature or other running condition of the second engine is measured by a second thermostat 14.

The main and auxiliary shutters 10, 11 and 12 are operated by fluid under pressure supplied by a pump 16 driven by a motor 17 which is connected in circuits including the thermostats 13 and 14. The motor 17 is controlled by the thermostats 13 and 14, and the pump 16 thus supplies pressure fluid to a pressure line 18 having lines 19, 20 and 21 branching therefrom. The pressure fluid is directed past normally-closed solenoid-operated inlet valves 22, 23 and 24 to operate single-acting, spring-return fluid motors 26, 27 and 28 which are connected through suitable linkages 29, 30 and 31 to operate the shutters 10, 11 and 12. The operation of the fluid motors 26, 27 and 28 is controlled in part by normally-open solenoid-operated exhaust valves 32, 33 and 34 connected to their associated fluid motors by fluid lines 36, 37 and 38 respectively. Each exhaust valve 32, 33 and 34 is connected by a return line 39 to a sump or reservoir 41.

The pressure of the fluid delivered by the pump 16 may be regulated or relieved by a relief valve 42 connected in a relief line 43 branching from the pressure line 18 and connected to the return line 39 to the sump 41. The pump is supplied from the sump 41 by an intake line 44.

Each thermostat 13 and 14 is operable to control relays which in turn control the motor 17, the inlet valves 19, 20 and 21 and the exhaust valves 32, 33 and 34. Thermostat 13 is thus connected to control a pair of relays 46 and 47 which control the motor 17, main shutter 10 and auxiliary shutter 12. Thermostat 14 is thus also connected to control a pair of relays 48 and 49 which control the motor 17, main shutter 11 and auxiliary shutter 12.

It should here be noted, that when relays 46 and 47 are operable to control the auxiliary shutter 12, no condition of the thermostat 14, in operating relays 48 and 49 will affect the operation of the auxiliary shutter 12. Conversely, when relays 48 and 49 are operable to control the auxiliary shutter 12, no condition of the thermostat 13, in operating relays 47 and 48, will affect the operation of the auxiliary shutter 12. The details of the circuits accomplishing the above function will appear as this specification proceeds.

The control system according to the present invention is designed to maintain the main and auxiliary shutters in closed position if the engine is not up to proper running temperature. The thermostat 13 for the first engine is of the mercury column contact type, and includes a continuous contact 51, a low heat contact 52, and a high heat contact 53. When the top of the mercury column lies below contact 52, the relays 46 and 47 are energized.

The circuit energizing relay 46 includes a positive line P, buffer resistor 54, winding 56 of the relay 46, and then a lead 57 to the negative line N. The circuit energizing relay 47 includes positive line P, buffer resistor 58, lead 59, lead 61, winding 62 of the relay 47 and thence by the lead 57 to the negative line N.

When the relay 46 is thus energized, circuits are opened which control the operation of the motor 17 and the inlet valves 22 and 23. The circuit to the motor 17 includes positive line P, a contact 63 of the relay 46, a lead 64 and a lead 66 to the negative line N. The circuit to the inlet valve 22 for the main shutter 10 of the first engine radiator includes positive line P, a contact 67 of the relay 46, a lead 68, solenoid winding 69, a lead 71 and lead 66 to negative line N. The circuit to the inlet valve 23 for the auxiliary shutter 12 includes positive line P, a contact 72 of the relay 46, a lead 73, branching lead 74, solenoid winding 76 of the valve 23, a lead 77 and lead 66 to the negative line.

When the relay 47 is thus energized, circuits are opened which control the operation of the exhaust valves 32 and 33. The circuit to the exhaust valve 32 of the main shutter 10 of the first engine radiator includes a lead 78 from the supply line, a contact 79 of the relay 47, a lead 81 to a solenoid winding 82 of the exhaust valve 32, and thence by a lead 83 to the negative line. The circuit to the exhaust valve 33 of the auxiliary shutter 12 includes the positive line P, lead 78, a contact 84 of the relay 47, a lead 86 to a solenoid 87 of the exhaust valve 33, and thence by a lead 88 to the negative line.

Under the condition described above, the fluid motors 26 and 27 are ported to the return line 39 of the fluid pressure system, since the exhaust valves 32 and 33 are open when their solenoids are de-energized. Under this condition the inlet valves 22 and 23 are closed since their solenoids are de-energized, and they block the flow of the pressure fluid, if any, to the fluid motors 26 and 27. Since the fluid motors 26 and 27 are of the single-acting, spring-return type, their action is such as to return any fluid therein to the return line 39, and it will be apparent that the shutters 10 and 12 will close on the return stroke of the fluid motors 26 and 27.

The relays 46 and 47 carry contacts for closing circuits to apply heat to the thermostat 13 to change the condition of the relays 46 and 47, and place the valves controlling the operation of the shutters in condition for operation thereof. The relay 46 when energized as described above closes a circuit containing a contact 89, a lead 91, a cycling resistor 92, a lead 93, a heat coil 94 of the thermostat 13, and thence by a lead 96 connected to the lead 57 to the negative line. The cycling resistor 92 is so designed as to give 2° of heat on the coil 94 when the relay contact 89 is closed. The relay 47, when energized as described above, closes a circuit containing positive line P, lead 78, contact 97, cycling resistor 98, the lead 93, heater coil 94 and the leads 96 and 57 to the negative line N. The cycling resistor 98 is also so designed as to apply 2° of auxiliary heat on the coil 94, and it will be apparent that the closing of the two circuits just described will give 4° of auxiliary heat to the thermostat 13.

The heating effect just described will raise the mercury column in the thermostat 13 until it touches the contact 52. It will be seen that a short circuit will be then made to de-energize the relay 47, consisting of positive line P, limiting resistor 58, lead 59, the mercury column between contacts 51 and 52, lead 99, and thence by the lead 57 to the negative line N. The short circuit thus made will de-energize the winding 62 of the relay 47 thereby closing contacts 79 and 84, and opening contact 97. The winding 56 of relay 46, however, will remain energized, since the circuit therethrough will be maintained.

Under this condition of the relay 47, the coil 82 of the exhaust valve 32 will be energized thereby closing valve 32, and the coil 87 of exhaust valve 33 will also be energized thereby closing same.

However, contact 97 of relay 47 will be opened thereby reducing the amount of heat on the heater coil 94 of thermostat 13 by 2° and it will be apparent that contact 89 of relay 46 will remain closed to supply 2° of heat to the heater coil 94.

Since the condition of relay 46 is unchanged, the circuits to motor 17 will remain in open condition, and the inlet valves 22 and 23 will remain closed since their respective solenoids 69 and 76 will be de-energized. Since the fluid within the fluid motors 26 and 27 has been already exhausted the shutters 10 and 12 will remain closed.

The presence of 2° of heat on the heater coil plus the heating effect of the coolant of the first engine may raise the mercury column in the thermostat 13 until it makes contact with the contact 53. Under this condition a short circuit is made which de-energizes the winding 56 of relay 46, said circuit consisting of the positive line P, limiting resistor 54, lead 101 to contact 53, the mercury column between contacts 53 and 52 and thence by leads 99 and 57 to the negative line N.

With winding 56 of relay 46 thus de-energized, contacts 63, 67 and 72 will close, while contact 89 thereof will open. The closing of contact 63 will energize motor 17 to drive pump 16 to furnish fluid under pressure to operate the fluid motors 26 and 27, at the same time completing a ground circuit for valves 22 and 23. The closing of contact 67 will open inlet valve 22 and operate fluid motor 26 to open the main shutter 10, it being remembered that exhaust valve 32 remains closed to hold the pressure fluid within the fluid motor 26. The closing of contact 72 will open inlet valve 23 and operate fluid motor 27 to open the auxiliary shutter 12, it being remembered that exhaust valve 33 remains closed to hold the pressure fluid within the fluid motor 27.

The opening of contact 89 will completely cut off the heat from the heater coil 94 of thermostat 13, and if the engine temperature is not high enough to hold the mercury column up to the contact 53 the relay 46 will once more become energized, thereby opening contacts 63, 67 and 72 which will close valves 22 and 23 and trap pressure fluid in the fluid motors 26 and 27 to hold the shutters 10 and 12 open. The circuit to motor 17 will thus be opened thereby stopping the pump 16 and minimizing wear thereof.

The contact 89 will once more be closed to apply 2° of heat to the thermostat 13 thereby repeating the operation of supplying pressure fluid to the motors 26 and 27 through the inlet valves 22 and 23.

The main shutter 11 of the other engine radiator is under the control of the thermostat 14, and under conditions as will be described, the auxiliary shutter 12 is also under the control of the thermostat 14, provided thermostat 13 is not controlling the auxiliary shutter 12.

The thermostat 14 of the second engine is of the mercury column contact type, and includes a continuous contact 102, a low heat contact 103, and a high heat contact 104. The relays 48 and 49 are adapted to be energized when the mercury column of thermostat 14 lies below contact 103, and the circuit energizing relay 48 under such condition of the thermostat 14 includes positive line P, limiting resistor 106, lead 107, winding 108 of the relay 48, and thence through lead 109 and the lead 57 to the negative line N. The circuit energizing relay 49 includes the positive line P, limiting resistor 100, lead 105, winding 110 of the relay 49, lead 115 connected to the lead 109, and thence to the negative line N by the leads 109 and 57.

When the relay 48 is thus energized, circuits which control the operation of the motor 17 and the inlet valves 23 and 24 are opened. The circuit to the motor 17 includes positive line P, lead 111, contact 112 of the relay 48, lead 113, lead 64, and the lead 66 to the negative line N. The circuit to the inlet valve 24 for the other main shutter 11 includes positive line P, the lead 111, a contact 114 of the relay 48, a lead 116, solenoid winding 117 of the inlet valve 24, and a lead 118 and 66 to the negative line N. The circuit to the inlet valve 23 of the auxiliary shutter 12 includes positive line P, the lead 111, a contact 119 of the relay 48, a lead 121, the lead 74, solenoid winding 76 of the inlet valve 23, and the leads 77 and 66 to the negative line N.

It will be noted that contacts 63 and 112 are in parallel across the supply line and that the motor 17 will be energized when either relay 46 or 48 is de-energized. Likewise, contacts 72 and 119 are in parallel across the positive and negative lines and the solenoid 76 auxiliary inlet valve 23 will be energized when either relay 46 or 48 is de-energized. It will also be noted that the main shutter inlet valves 22 and 24 are under control by their respective relays 46 and 48 only.

When the relay 49 is thus energized, circuits which control the operation of the exhaust valves 33 and 34 are opened. The circuit to the exhaust valve 34 of the main shutter of the second engine includes a lead 122 from the supply line, contact 123, a lead 124, a solenoid 126 of the exhaust valve 34, and a lead 127 to the other side of the supply line. The circuit to the auxiliary shutter exhaust valve 33 includes the lead 122, a contact 128 of the relay 49, a lead 129, the lead 86, the solenoid 87 of the exhaust valve 33, and the lead 88 to the other side of the supply line.

Under the condition just described for the relays 48 and 49, the fluid motors 27 and 28 are ported to the return line 39, since both are open when their solenoids are de-energized. Under this condition, the inlet valves 23 and 24 are likewise closed, since their solenoids are de-energized, thus blocking the flow of fluid to the motors 27 and 28. It will be apparent that the shutters 11 and 12 will be closed by the action of the return springs of the motors 27 and 28. It will be apparent, also, that if thermostat 13 is calling for auxiliary shutter 12 to remain open, such demand will govern, instead of the demand of thermostat 14, calling for the shutter 12 to remain closed.

The relays 48 and 49 carry contacts for the application of heat to the thermostat 14 to change the condition of the relays 48 and 49 and place the inlet valves 23 and 24 and the exhaust valves 33 and 34 in condition for operation of the shutters 11 and 12. The relay 48 when energized as described above closes a circuit containing the lead 111, a contact 130, a limiting resistor 131, a lead 132, a heater coil 133 of the thermostat 14, and a lead 134 to the other side of the supply line. The limiting resistor 131 is so designed as to give 2° of heat on the coil 133. The relay 49 when energized as described above closes a circuit containing the lead 122, a contact 137 of the relay 49, a limiting resistor 138, the lead 132, heater coil 133, and the leads 134 and 57. The limiting resistor 138 is also designed as to give 2° of heat on the coil 133, and it will be apparent that the closing of the two circuits just described will give 4° of heat to the thermostat 14.

The heating effect will raise the mercury column in the thermostat 14 until it touches the contact 103, which may be considered the normal heat point for the engines. It will be seen that a short circuit will be made to de-energize the relay 49, consisting of the limiting resistor 100, lead 105, a lead 120, the length of the mercury column between contacts 102 and 103, a lead 125, and thence by the leads 109 and 57 to the other side of the supply line. The circuit thus made will de-energize the winding 110 of the relay 49 thereby closing contacts 123 and 128 and opening contact 137.

It will be noted that contact 84 of relay 47 and contact 128 of relay 49 are connected in parallel across the supply line and that the solenoid 87 of the auxiliary shutter exhaust valve 33 will be energized when either contact 84 or contact 128 is closed. It will thus be apparent that if either thermostat 13 or 14 is at normal heat condition the exhaust valve 33 will be closed.

The de-energization of relay 49 will open contact 137 to reduce the amount of heat on the heater coil 133 by 2°, and it will be apparent that contact 131 will remain closed to continue to supply 2° of heat to the heater coil 133.

Since the condition of relay 48 is unchanged, the circuits to motor 17 will remain unchanged as respects the thermostat 14, and the inlet valves 23 and 24 will remain closed since their respective solenoids 76 and 117 will be de-energized. Since the fluid within the fluid motors 27 and 28 has been exhausted by the exhaust valves, the shutters 11 and 12 will remain closed.

It should be noted, however, that inlet valve 23 and exhaust valve 33 are also under the control of the relays 46 and 47, and if the thermostat 13 is at high heat the valves 23 and 33 will be under the control of said thermostat irrespective of the condition of thermostat 14.

The presence of 2° of heat on the heater coil 133 plus the heating effect of the coolant of the second engine may raise the mercury column in the thermostat 14 until it makes contact with the contact 104. Under this condition a short circuit is made which de-energizes the winding 108 of relay 48, said circuit consisting of limiting resistor 106, lead 107, a lead 139, the length of the mercury column between contacts 104 and 103, the lead 125, leads 109 and 57 to the other side of the supply line.

When the winding 108 of relay 48 is thus de-energized, contacts 112, 114 and 119 will close, while contact 131 will open. The closing of contact 112 will energize motor 17 to drive the pump 16, at the sametime completing a ground for the inlet valves 23 and 24. The closing of contact 114 will open the inlet valve 24 for the shutter 11 of the second engine, and fluid will pass therethrough to operate the fluid motor 28, it being remembered that exhaust valve 34 remains closed to hold the pressure fluid within the fluid motor 28. The closing of contact 119 will open inlet valve 23 and operate fluid motor 27 to open auxiliary shutter 12, it being remembered that exhaust valve 33 remains closed to hold the pressure fluid within the fluid motor 27.

The opening of contact 131 by the shunting out of relay 48 will completely cut off the heat from the heater coil 133 of thermostat 14, and if the temperature of the second engine is not high enough to hold the mercury column up to the contact 104, the relay 48 will once more become energized, thereby opening contacts 112, 114 and 119 to close valves 23 and 24 and trap fluid in the fluid motors 27 and 28 and hold shutters 11 and 12 open. The circuit to motor 17 will thus be opened thereby stopping pump 16.

The contact 131 will once more be closed to apply 2° of heat to the thermostat 14, thereby repeating the operation of supplying pressure fluid to the motors 27 and 28 through the inlet valves 23 and 24.

Assuming a condition where the first engine is operating at normal heat with the mercury in the thermostat 13 between contact points 52 and 53, and where the second engine is running hot with the mercury in thermostat 14 making contact with the contact 104, the following conditions will obtain. Under this condition, and as has been previously described in detail, relay 46 will be energized while relay 47 will be de-energized. Relays 48 and 49 under this condition will both be de-energized. This will cause motor 17 to start and supply fluid under pressure. Valve 34 will close, while valve 24 will open to supply pressure fluid to open main shutter 11. Valve 33 will likewise close, while valve 23 will open to open auxiliary shutter 12. Valve 22 will close, while valve 32 will remain closed thus trapping the pressure fluid in fluid motor 26 to maintain shutter 10 open. It will be remembered that relay 46 will continue to supply 2° of heat to heater coil 94 and thus attempt to raise the mercury column in thermostat 13 to de-energize relay 46.

Under this condition of the thermostat 13, the relays 46 and 47 would normally call for a similar operation of the valves 23 and 24 as the valves 22 and 23, but it will be remembered that the relay 48 is now controlling valve 23 and that relay 49 is now controlling valve 33. Likewise, relay 48, instead of relay 46, is controlling the operation of motor 17. Obviously, the conditions obtaining where the first engine is at high heat, and the second engine is at normal heat are reversed as respects the control relays 46, 47, 48 and 49.

It will thus be seen that the engine operating at high heat is controlling of the condition of the auxiliary shutter as well as the condition of its main shutter. It will also be seen that the thermostats 13 and 14 constantly maintain the temperature of each engine at such a value as to promote maximum efficiency. In opening the shutters, both main and auxiliary, for cooling, the possible overcooling effect is also corrected by the thermostats, the amount of corrective heat being varied in accordance with the amount of cooling obtained by the shutters.

While the invention has been described in terms of a preferred embodiment thereof, it is intended that the invention be limited only by the terms of the claims here appended.

We claim:

1. A temperature control system for adjusting the positions of a plurality of shutters for controlling the delivery of air to a selected location and including a pair of main shutters actuated by separate fluid pressure motors and an auxiliary shutter cooperatively associated with both main shutters and actuated by a fluid motor, means for regulating the position of one main shutter and said auxiliary shutter in accordance with the temperature condition at one selected location, comprising a first thermostat and relay circuits controlled thereby for regulating the flow of pressure fluid to a fluid motor associated with one main shutter and to the fluid motor associated with the auxiliary shutter, means for regulating the position of the other main shutter, comprising a second thermostat and relay circuits controlled thereby for regulating the flow of pressure fluid to the fluid motor associated with the last mentioned main shutter, and means including additional relay circuits associated with the second thermostat and selectively effective for controlling the flow of pressure fluid to the fluid motor for adjusting the position of said auxiliary shutter.

2. A temperature control system for adjusting the positions of a plurality of shutters for controlling the delivery of air to selected locations and including a pair of main shutters actuated by separate fluid pressure motors and an auxiliary shutter cooperatively associated with both main shutters and actuated by a fluid motor, means for regulating the position of one main shutter and said auxiliary shutter in accordance with the temperature condition at one selected location, comprising a first thermostat and relay circuits controlled thereby for regulating the flow of pressure fluid to a fluid motor associated with one main shutter and to the fluid motor associated with the auxiliary shutter, means for regulating the position of the other main shutter, comprising a second thermostat and relay circuits controlled thereby for regulating the flow of pressure fluid to the fluid motor associated with the last mentioned main shutter and to the fluid motor associated with said auxiliary shutter, and means for preventing the change in position of said auxiliary shutter by the last mentioned means when the first named means is regulating the position of said auxiliary shutter, comprising parallel circuits to regulate the flow of pressure fluid to said auxiliary shutter fluid motor, one of said parallel circuits being closed by the relay circuits controlled by said first thermostat.

3. In combination with a plurality of shutters for controlling the delivery of air to selected locations for maintaining predetermined temperatures at said locations, of means for adjusting the positions of said shutters to vary the amount of air delivered comprising separate fluid pressure motors for actuating the shutters, a fluid pressure system comprising an electrically operated pump for supplying pressure fluid to said fluid pressure motors, means comprising a thermostat responsive to the temperature at one selected location and a pair of relays controlled thereby for controlling the flow of pressure fluid to two of said pressure motors so as to adjust the positions of the two shutters associated therewith, and means comprising a thermostat responsive to the temperature at another location and a pair of relays controlled thereby for controlling the flow of pressure fluid to another of said pressure motors and to one pressure motor of said pair; whereby one pressure motor of said pair may be selectively controlled by either thermostat through circuits connected through one of the relays controlled by such thermostat.

4. In combination with a plurality of shutters for controlling the delivery of air to selected locations for maintaining predetermined temperatures at such locations, of means for adjusting the positions of said shutters to vary the amount of air delivered comprising separate fluid pressure motors for actuating the shutters, a fluid pressure system comprising an electrically operated pump for supplying pressure fluid to said fluid pressure motors, means comprising a thermostat responsive to the temperature at one selected location, a pair of relays controlled thereby and electrical circuit conductors connected in parallel through one relay of said pair for controlling the flow of pressure fluid to two of said pressure motors so as to adjust the positions of the two shutters associated therewith, and means comprising a thermostat responsive to the temperature at another location, a pair of relays controlled thereby and electrical circuit conductors connected in parallel through one relay of the last mentioned pair for controlling the flow of pressure fluid to another of said pressure motors and to one pressure motor of said pair; whereby one pressure motor of said pair may be selectively controlled by either thermostat through circuits connected through one of the relays controlled by each thermostat.

5. In combination with a plurality of valves for controlling the delivery of a temperature altering medium to maintain a predetermined temperature at selected locations, of means for adjusting said valves in response to said predetermined temperatures comprising separate fluid pressure motors connected to each of said valves, electrically actuated inlet and outlet valves for each fluid pressure motor, a thermostat responsive to the temperature at one selected location, a pair of relays including electrical energizing circuits therefor connected through said thermostat, means defining electrical energizing circuits for said inlet valves connected through one of said relays, means defining electrical energizing circuits for said outlet valves connected through the other relay, a second thermostat responsive to a predetermined temperature at another of said selected locations, a second pair of relays having their energizing circuits connected through the second thermostat, means connected through one relay of the second pair and defining an electric circuit for the inlet valve of one of said fluid pressure motors, and means connected through the other relay of the second pair and defining an electric circuit for the outlet valve of the last mentioned fluid pressure motor, whereby one of said fluid pressure motors may be selectively controlled in response to a predetermined temperature at either of said selected locations.

6. In combination with a plurality of shutters for controlling the delivery of air to selected locations for maintaining predetermined temperatures at said locations, of means for adjusting the positions of said shutters to vary the amount of air delivered comprising separate fluid pressure motors, each being operated in one direction by fluid pressure to impart an opening movement to the shutters and operated in reverse direction by spring pressure to impart a closing movement to the shutters, an electrically operated inlet valve for each pressure motor to control the admission of pressure thereto, an electrically operated exhaust valve for each fluid motor to control the discharge of pressure fluid therefrom, a fluid pressure system comprising an electrically operated pump for supplying the pressure fluid to the inlet valves of all pressure motors, means comprising a first thermostat responsive to the temperature at a selected location, a first pair of relays controlled thereby and electrical circuit connectors connected in parallel through one of said relays for controlling the opening and closing of the inlet valves of two of said pressure motors so as to adjust the opening positions of the two shutters associated therewith, means comprising electrical conductors connected in parallel through the other relay of said pair for controlling the operation of the exhaust valves for said two pressure motors, and means comprising a second thermostat responsive to the temperature at another location, a pair of relays controlled thereby and electrical connectors connected in parallel through one relay of the last named pair for controlling the operation of the inlet valve of another pressure fluid motor and the operation of the inlet valve of one of the two previously named pressure motors to control the admission of fluid pressure thereto, means defining electrical circuits connected in parallel through the other of the last mentioned pair of relays for controlling the operation of the exhaust valves of the two last mentioned pressure motors, whereby the opening and closing adjustments of one shutter of the first pair may be selectively controlled by either thermostat and the relays associated therewith.

7. Apparatus for adjusting the positions of a plurality of air delivery shutters as defined in claim 6 characterized in that the said inlet valves are spring closed and electrically energized open and the exhaust valves are spring opened and electrically energized closed.

8. Apparatus for adjusting the positions of a plurality of air delivery shutters as defined in claim 7 characterized in that each thermostat is provided with spaced upper and lower contacts defining the upper and lower limits of a predetermined range, the upper contacts of each thermostat being connected in a shunt control circuit adapted to deenergize one of its associated relays, to close energizing circuits through the pressure motor inlet valves, whereby the fluid pressure motors associated with said relays are operated in a direction to open the shutters, and the lower contacts of each thermostat being normally connected in a shunt control circuit adapted to be opened, when the temperature falls below the lower limit of said temperature range, to permit the exhaust valves to open, whereby the fluid pressure motors are operated in a direction to close said shutters.

9. In combination with a pair of main shutters for controlling the delivery of air to the cooling systems of two engines and an auxiliary shutter for delivering additional air to the cooling systems of both engines, of fluid pressure motors operable to adjust the positions of said shutters to vary the amount of air delivered in relation to the cooling load, a fluid pressure system comprising a motor and a pump operated thereby for supplying pressure fluid to said fluid motors, an inlet valve for each fluid motor to control the admission of pressure fluid thereto, an exhaust valve for each fluid motor to control the porting of pressure fluid therefrom, means for regulating the position of one main shutter and said auxiliary shutter in accordance with the temperature condition of one engine, means for regulating the position of the other main shutter and said auxiliary shutter in accordance with the temperature condition of the other engine, and means for preventing the change in position of said auxiliary shutter by said second named means when said first named means is regulating the position of said auxiliary shutter.

10. In combination with a pair of main shutters for controlling the delivery of air to the cooling systems of two engines and an auxiliary shutter for delivering additional air to the cooling system of both engines, of fluid pressure motors operable to adjust the positions of said shutters to vary the amount of air delivered in relation to the cooling load, a fluid pressure system comprising a motor and a pump operated thereby for supplying pressure fluid to said fluid motors, an inlet valve for each fluid motor to control the admission of pressure fluid thereto, an exhaust valve for each fluid motor to control the porting of pressure fluid therefrom, means for regulating the position of the main shutter of one of said engines and said auxiliary shutter in accordance with the temperature condition of the said one engine, comprising a first thermostat and a pair of relays controlled thereby, one of said relays closing a circuit to said motor and said pump to supply pressure fluid to said first main shutter fluid motor and said auxiliary shutter fluid motor, said relay also closing circuits to said inlet valves for said main shutter fluid motor and said auxiliary shutter fluid motor, the other of said relays closing circuits to said exhaust valves for said main and auxiliary shutter fluid motors, means for regulating the position of the main shutter of the other of said engines and said auxiliary shutter in accordance with the condition of the said other engine, comprising a second thermostat and a second pair of relays controlled thereby, the first of said second pair of relays closing a circuit to said motor and said pump to supply pressure fluid to said second main shutter fluid motor and said auxiliary shutter fluid motor, said first relay of said second pair of relays also closing circuits to said inlet valves for said second main shutter fluid motor and said auxiliary shutter fluid motor, the other of said second pair of relays closing circuits to said exhaust valves for said second main shutter and said auxiliary shutter fluid motors, and means for preventing the change in position of said auxiliary shutter by said second named means when said first named means is regulating the position of said auxiliary shutter.

11. In combination with a pair of main shutters for controlling the delivery of air to the cooling systems of two engines and an auxiliary shutter for delivering additional air to the cooling system of both engines, of fluid pressure motors operable to adjust the positions of said shutters to vary the amount of air delivered in relation to the cooling load, a fluid pressure system comprising a motor and a pump operated thereby for supplying pressure fluid to said fluid motors, an inlet valve for each fluid motor to control the admission of pressure fluid thereto, an exhaust valve for each fluid motor to control the porting of pressure fluid therefrom, means for regulating the position of the main shutter of one of said engines and said auxiliary shutter in accordance with the temperature condition of the said one engine, comprising a first thermostat and a pair of relays controlled thereby, one of said relays closing a circuit to said motor and said pump to supply pressure fluid to said first main shutter fluid and said auxiliary shutter fluid motor, said relay also closing circuits to said inlet valves for said main shutter fluid motor and said auxiliary shutter fluid motor, the other of said relays closing circuits to said exhaust valves for said main and auxiliary shutter fluid motors, means for regulating the position of the main shutter of the other of said engines and said auxiliary shutter in accordance with the condition of the said other engine, comprising a second thermostat and a second pair of relays controlled thereby, the first of said second pair of relays closing a circuit to said motor and said pump to supply pressure fluid to said second main shutter fluid motor and said auxiliary shutter fluid motor, said first relay of said second pair of relays also closing circuits to said inlet valves for said second main shutter fluid motor and said auxiliary shutter fluid motor, the other of said second pair of relays closing circuits to said exhaust valves for said second main shutter and said auxiliary shutter fluid motors, and means for preventing the change in position of said auxiliary shutter by said second named means when said first named means is regulating the position of said auxiliary shutter, comprising parallel circuits to regulate the flow of pressure fluid to said auxiliary shutter fluid motor, one of said parallel circuits including parallel circuits to said pump drive motor, the second of said parallel circuits including parallel circuits to said auxiliary shutter fluid motor inlet valve, and another of said parallel circuits including parallel circuits to said auxiliary shutter fluid motor exhaust valve.

References Cited in the file of this patent

UNITED STATES PATENTS

| Number | Name | Date |
|---|---|---|
| 2,112,998 | Ray | Apr. 5, 1938 |
| 2,153,382 | Martin | Apr. 4, 1939 |
| 2,235,620 | Nessell | Mar. 18, 1941 |
| 2,336,840 | Brehob | Dec. 14, 1943 |
| 2,401,004 | Lehane | May 28, 1946 |